(12) United States Patent  
Kashiwada

(10) Patent No.: US 12,212,206 B2
(45) Date of Patent: Jan. 28, 2025

(54) BUSBAR MODULE FOR ROTATING ELECTRIC MACHINE

(71) Applicant: SUMITOMO WIRING SYSTEMS, LTD., Mie (JP)

(72) Inventor: Tomokazu Kashiwada, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 277 days.

(21) Appl. No.: 17/870,987

(22) Filed: Jul. 22, 2022

(65) Prior Publication Data
US 2023/0034343 A1 Feb. 2, 2023

(30) Foreign Application Priority Data
Jul. 29, 2021 (JP) .................. 2021-124637

(51) Int. Cl.
H02K 3/50 (2006.01)
(52) U.S. Cl.
CPC ........... H02K 3/50 (2013.01); H02K 2203/09 (2013.01)
(58) Field of Classification Search
CPC .................................................. H02K 2203/09
See application file for complete search history.

(56) References Cited

U.S. PATENT DOCUMENTS 9,780,506 B2 * 10/2017 Houzumi ............. H01R 25/161
2015/0295371 A1 * 10/2015 Houzumi ............ B29C 45/1459
264/261
2018/0040392 A1 * 2/2018 Fujiwara .................. H02K 3/50

FOREIGN PATENT DOCUMENTS

JP 2020-167843 A 10/2020
WO WO-2014136496 A1 * 9/2014 ............. H01R 43/16

* cited by examiner

Primary Examiner — Robert W Horn
(74) Attorney, Agent, or Firm — Venjuris, P.C.

(57) ABSTRACT

A busbar module is provided with busbars arranged at intervals from each other in a first direction and arranged side by side in a second direction, and a holding member configured to cover the busbars. Each of the busbars includes a first connecting portion extending in the first direction, a second connecting portion extending in the third direction and an intermediate portion extending in the second direction between the first connecting portion and the second connecting portion. The holding member includes a first holding portion configured to cover the first and second busbars and interposed between the first and second busbars and a second holding portion configured to cover the first holding portion the third busbar. The third busbar is in contact with the first holding portion.

8 Claims, 14 Drawing Sheets

BUSBAR MODULE FOR ROTATING ELECTRIC MACHINE

CROSS-REFERENCE TO RELATED APPLICATIONS

This application is based on and claims priority from Japanese Patent Application No. 2021-124637, filed on Jul. 29, 2021, with the Japan Patent Office, the disclosure of which is incorporated herein in its entirety by reference.

TECHNICAL FIELD

The present disclosure relates to a busbar module for rotating electric machine.

BACKGROUND

Japanese Patent Laid-open Publication No. 2020-167843 discloses a busbar unit used in a stator for rotating electric machine. This busbar unit includes busbars to be electrically connected to a coil of the stator and a holding member made of resin for holding the busbar.

The coil is composed of three phase coils including a first phase coil, a second phase coil and a third phase coil.

The busbars include a first busbar to be connected to the first phase coil, a second busbar to be connected to the second phase coil, a third busbar to be connected to the third phase coil and a neutral wire busbar to be connected to a neutral wire of the coil.

The holding member integrally holds the first busbar, the second busbar, the third busbar and the neutral wire busbar.

Such a busbar unit is molded by filling a molten resin into a cavity formed by a mold and the respective busbars with the respective busbars inserted in the mold for molding the holding member.

SUMMARY

In the busbar unit for rotating electric machine (hereinafter, referred to as a busbar module) as just described, the holding member is interposed between the respective busbars, whereby the busbars are insulated from each other. However, if cross-sectional areas of gaps between the busbars are small, the molten resin is hard to flow in these gaps. In this way, if cross-sectional areas of flow passages on sides opposite to the gaps across the busbars, out of the cavity, are larger than those of the gaps, a difference is created between a fluid pressure of the molten resin flowing in the gaps and a fluid pressure of the molten resin flowing in the flow passages. Thus, there is a problem that the busbars are easily deviated from proper positions due to such a pressure difference.

The present disclosure aims to provide a busbar module for rotating electric machine capable of suppressing positional deviations of busbars.

A busbar module for rotating electric machine of the present disclosure is a busbar module to be electrically connected to a coil of a stator constituting a rotating electric machine, and provided with a plurality of busbars arranged at intervals from each other in a first direction and arranged side by side in a second direction when an axial direction, a circumferential direction and a radial direction of the rotating electric machine are respectively the first direction, the second direction and a third direction, and a holding member formed of electrically insulating resin to cover the plurality of busbars, wherein the plurality of busbars include a first busbar, a second busbar and a third busbar each having a first connecting portion extending in the first direction and to be electrically connected to a power supply, a second connecting portion extending in the third direction and configured to supply power from the power supply to the stator, and an intermediate portion extending in the second direction between the first and second connecting portions, the holding member includes a first holding portion configured to cover the first and second busbars and interposed between the first and second busbars and a second holding portion configured to cover the first holding portion and the third busbar, and the third busbar is in contact with the first holding portion.

According to the present disclosure, it is possible to suppress positional deviations of busbars.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
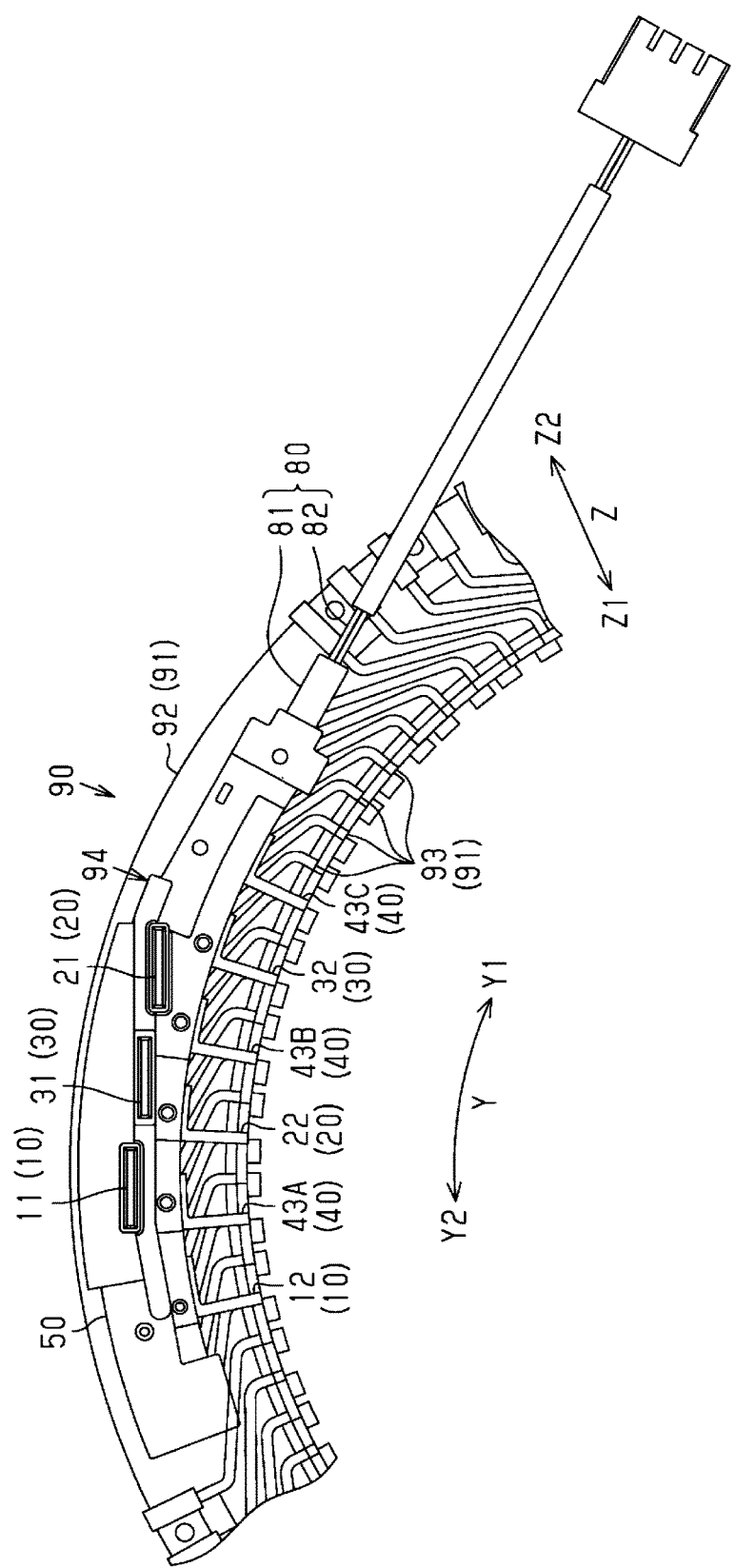
FIG. 1 is a plan view showing a busbar module mounted on a stator in one embodiment of the busbar module for rotating electric machine.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The busbar module for rotating electric machine of the present disclosure is a busbar module to be electrically connected to a coil of a stator constituting a rotating electric machine and is provided with a plurality of busbars arranged at intervals from each other in a first direction and arranged side by side in a second direction when an axial direction, a circumferential direction and a radial direction of the rotating electric machine are respectively the first direction, the second direction and a third direction, and a holding member formed of electrically insulating resin to cover the plurality of busbars, wherein the plurality of busbars include a first busbar, a second busbar and a third busbar each having a first connecting portion extending in the first direction and to be electrically connected to a power supply, a second connecting portion extending in the third direction and configured to supply power from the power supply to the stator, and an intermediate portion extending in the second direction between the first and second connecting portions, the holding member includes a first holding portion configured to cover the first and second busbars and interposed between the first and second busbars and a second holding portion configured to cover the first holding portion and the third busbar, and the third busbar is in contact with the first holding portion.

According to this configuration, a primary molded body composed of the first busbar, the second busbar and the first holding member is formed by filling a molten resin into a cavity of a first mold with the first and second busbars inserted in the first mold. At this time, an interval between the busbars can be increased as compared to the case where the molten resin is filled into a cavity of a mold with the first, second and third busbars inserted in the mold. In this way, a difference in the fluid pressure of the molten resin is suppressed. Therefore, positional deviations of the first and second busbars are suppressed.

Subsequently, a secondary molded body composed of the primary molded body, the third busbar and the second holding portion is formed by filling a molten resin into a cavity of a second mold with the primary molded body and the third busbar inserted in the second mold. At this time, since the third busbar is in contact with the first holding portion, there is no gap between the third busbar and the first holding portion. Thus, the molten resin does not flow between the third busbar and the first holding portion. In this way, a positional deviation of the third busbar is suppressed as compared to the case where the molten resin is filled with a gap formed between the third busbar and the first holding portion.

Therefore, the positional deviations of the busbars can be suppressed.

[2] Preferably, the intermediate portion of the third busbar is in the form of a plate extending in the first and second directions, and the first holding portion includes a base portion having a contact surface, one end surface in the first direction of at least one of the first connecting portion and the intermediate portion of the third busbar being brought into contact with the contact surface, and a projection projecting from the base portion on both sides in the third direction of the contact surface and configured to sandwich at least one of the first connecting portion and the intermediate portion of the third busbar.

According to this configuration, in forming the secondary molded body, a relative movement of the third busbar with respect to the first holding portion, i.e. the primary molded body, in the third direction due to the fluid pressure of the molten resin can be restricted by the projection. Therefore, the positional deviation of the third busbar can be further suppressed.

[3] Preferably, at least one of the first, second and third busbars includes a through hole penetrating in the first direction, and the holding member includes a communication hole communicating with the through hole in the first direction.

For example, in a configuration in which the first and second busbars include through holes and the first holding portion includes communication holes respectively communicating with these through holes, the following manufacturing method can be adopted. That is, when the first mold is clamped, positioning pins are inserted into the respective through holes of the first and second busbars. In this state, the molten resin is filled into the cavity of the first mold. In this way, the positional deviations of the first and second busbars can be further suppressed. At this time, the first holding portion is formed with the communication holes communicating with the respective through holes.

Further, for example, in a configuration in which the third busbar includes a through hole and the second holding portion includes a communication hole communicating with this through hole, the following manufacturing method can be adopted. That is, when the second mold is clamped, a positioning pin is inserted into the through hole of the third busbar. In this state, the molten resin is filled into the cavity of the second mold. In this way, the positional deviation of the third busbar can be further suppressed. At this time, the second holding portion is formed with the communication hole communicating with the through hole.

Therefore, according to the above configuration, the positional deviation of at least one of the first, second and third busbars can be further suppressed.

[4] Preferably, each of the first, second and third busbars includes the through hole.

According to this configuration, the positional deviations of the first, second and third busbars can be further suppressed.

[5] Preferably, the communication hole includes a first hole formed in the first holding portion and a second hole formed in the second holding portion, and the second hole communicates with the first hole in the first direction.

In a configuration in which the second hole formed in the second holding portion communicates with the first hole formed in the first holding portion, the following manufacturing method can be adopted. That is, when the second mold is clamped, a positioning pin is inserted into the through hole provided in at least one of the first and second busbars constituting the primary molded body and the first hole communicating with this through hole. Therefore, according to the above configuration, the through hole and the first hole formed in the first holding portion, which holes are used in forming the primary molded body, can be used in forming the secondary molded body.

[6] Preferably, the plurality of busbars include a fourth busbar to be electrically connected to a neutral wire of the coil, the first holding portion includes a base portion having a first contact surface, one end surface in the first direction of at least one of the first connecting portion and the intermediate portion of the third busbar being brought into contact with the first contact surface, and a second contact surface located on a side opposite to the first contact surface in the first direction, the fourth busbar being brought into contact with the second contact surface, and the second holding portion covers the fourth busbar.

According to this configuration, a secondary molded body composed of the primary molded body, the third busbar, the fourth busbar and the second holding portion is formed by filling the molten resin into the cavity of the second mold with the primary molded body, the third busbar and the fourth busbar inserted in the second mold. At this time, since the fourth busbar is in contact with the first holding portion, there is no gap between the fourth busbar and the first holding portion. Thus, the molten resin does not flow between the fourth busbar and the first holding portion. In this way, a positional deviation of the fourth busbar can be suppressed as compared to the case where the molten resin is filled with a gap formed between the fourth busbar and the first holding portion.

[7] Preferably, the first connecting portion of the third busbar is located between the first connecting portion of the first busbar and the first connecting portion of the second busbar in both the second and third directions, the first holding portion covers the first connecting portions of both the first and second busbars, the intermediate portion of the third busbar extends from the first connecting portion toward one side in the second direction, the third busbar includes an extending portion extending from a base end of the first connecting portion to a side opposite to the intermediate portion of the third busbar in the second direction, the intermediate portion of the third busbar is, in the third direction, in contact with a part of the first holding portion covering either one of the first and second busbars, and the extending portion is, in the third direction, in contact with a part of the first holding portion covering the other of the first and second busbars.

According to this configuration, the first holding portion is interposed between the first connecting portions of both the first and second busbars and the intermediate portion and the extending portion of the third busbar. Therefore, the first and second busbars are electrically insulated from the third busbar.

Further, in forming the secondary molded body, a relative movement of the third busbar with respect to the first holding portion, i.e. the primary molded body, in the third direction due to the fluid pressure of the molten resin is restricted by a part of the first holding portion covering the first connecting portions of both the first and second busbars. Therefore, the positional deviations of the busbars can be further suppressed.

Details of Embodiment of Present Disclosure

A specific example of a busbar module for rotating electric machine of the present disclosure is described below with reference to the drawings. In each figure, some of components may be shown in an exaggerated or simplified manner for the convenience of description. Further, a dimension ratio of each part may be different in each figure. Note that the present invention is not limited to these illustrations and is intended to be represented by claims and include all changes in the scope of claims and in the meaning and scope of equivalents. "Orthogonal" in this specification means not only strictly orthogonal, but also substantially orthogonal within a range in which functions and effects in this embodiment are achieved.

<Overall Configuration of Busbar Module 94>

Figure 2:
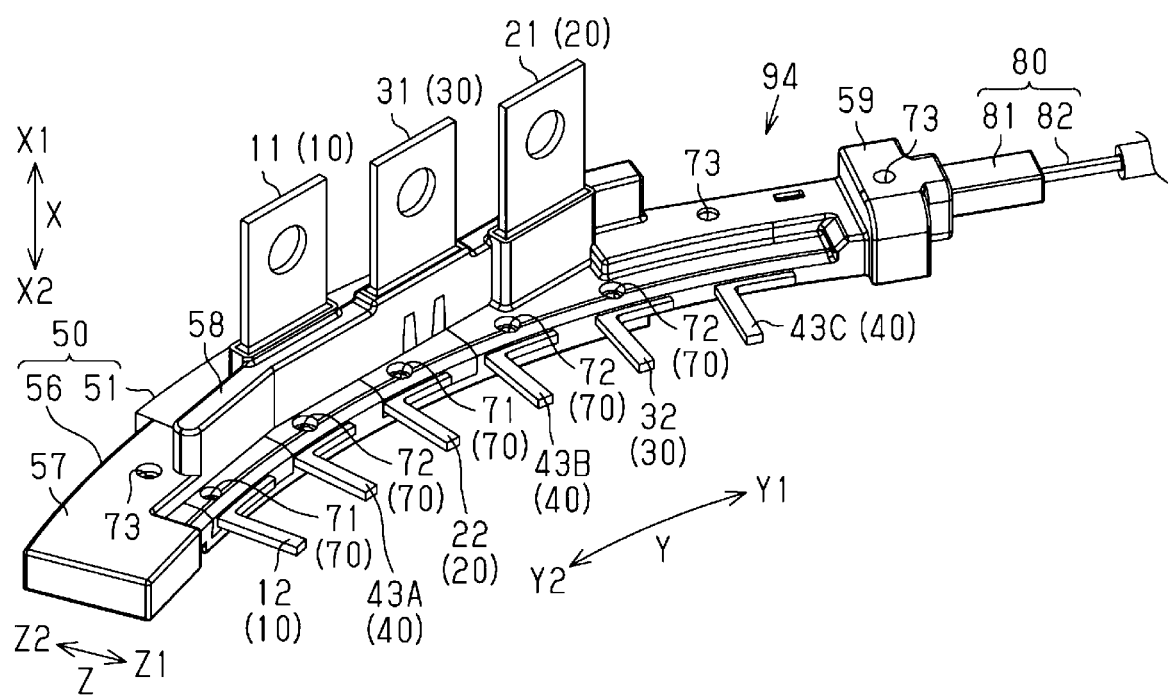
FIG. 2 is a perspective view showing the busbar module of FIG. 1.
Figure 3:
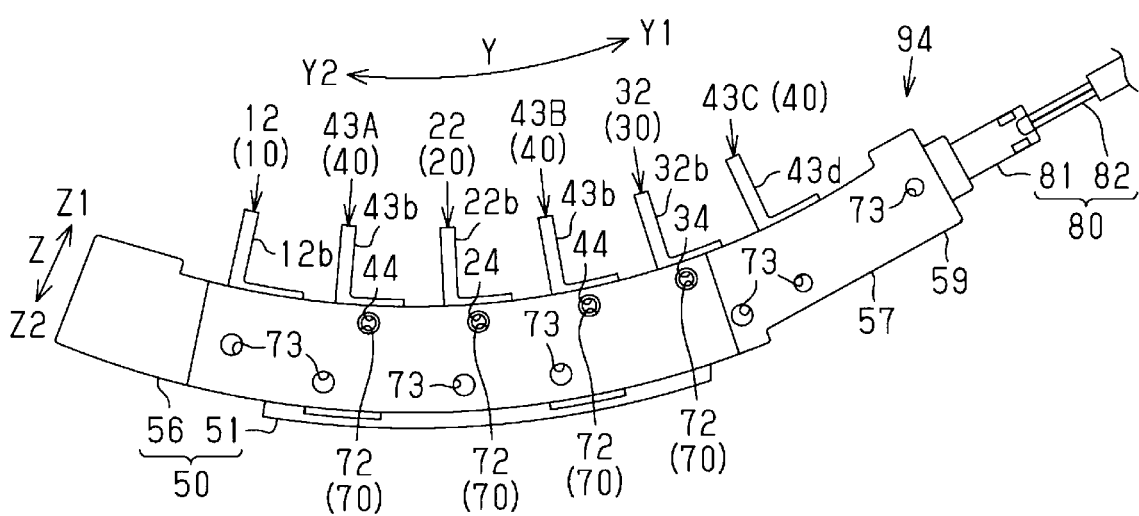
FIG. 3 is a bottom view showing the busbar module of FIG. 1.

As shown in FIGS. 1 to 3, a busbar module 94 is used, for example, in a rotating electric machine 90 such as a motor generator in a hybrid or electric vehicle.

The rotating electric machine 90 is composed of a tubular stator 91 including a stator core 92 formed with a plurality of slots (not show) and a coil 93 inserted in the slots, and a rotor (not shown) arranged radially inwardly of the stator 91. Note that, in this embodiment, the rotating electric machine 90 is a driven by a three-phase alternating current. The coil 93 is composed of three phase coils respectively corresponding to three phases (U-phase, V-phase and W-phase).

The busbar module 94 is arranged on one end part in an axial direction of the stator 91 and electrically connected to the coil 93.

Note that an axial direction, a circumzenithal direction and a radial direction of the rotating electric machine 90 are respectively referred to as a first direction X, a second direction Y and a third direction Z in the following description.

Further, in the first direction X, a side where the busbar module 94 is arranged on the stator 91 is referred to as one side X1 in the first direction and an opposite side thereof is referred to as an other side X2 in the first direction.

Further, in the third direction Z, a center axis side of the rotating electric machine 90 is referred to as an inner side Z1 in the third direction and an opposite side thereof is referred to as an outer side Z2 in the third direction.

The busbar module 94 includes a first busbar 10, a second busbar 20, a third busbar 30 and a fourth busbar 40 to be electrically connected to the coil 93, a holding member 50 for covering the respective busbars 10, 20, 30 and 40 and a temperature sensor 80.

The temperature sensor 80 detects a temperature of the coil 93 by detecting a temperature of the busbar electrically connected to the coil 93 and includes a temperature detector 81 and a wire 82 extending from the temperature detector 81. The temperature detector 81 is, for example, provided with a thermistor. The temperature sensor 80 is provided on one end part on one side of the busbar module 94 in the second direction Y.

Next, each component of the busbar module 94 is described in detail.

<Configurations of First Busbar 10 and Second Busbar 20>

Figure 4:
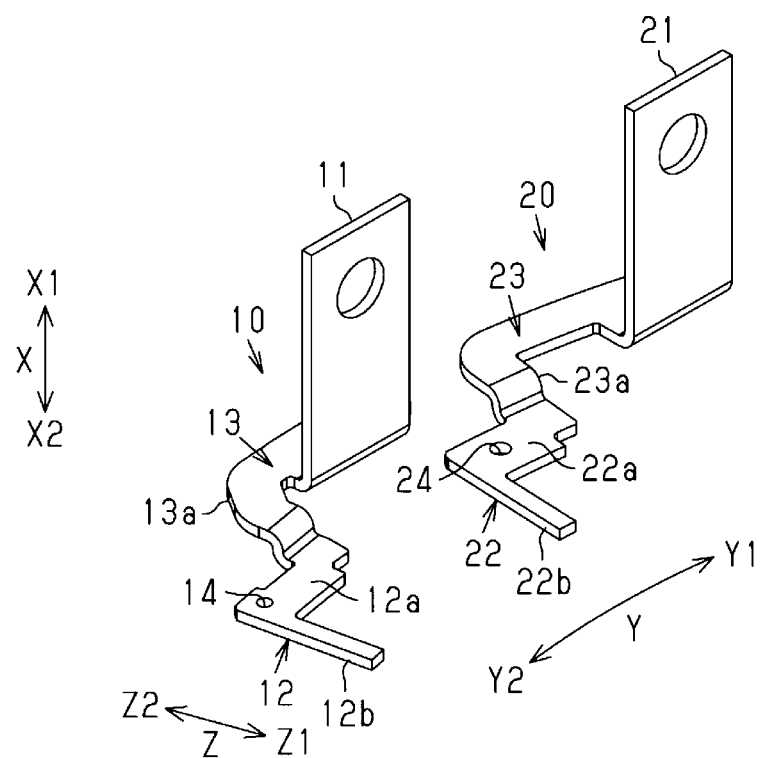
FIG. 4 is a perspective view showing a first busbar and a second busbar for the busbar module of FIG. 1.

As shown in FIG. 4, the first and second busbars 10, 20 are formed of an electrically conductive metal plate material.

The first and second busbars 10, 20 are successively arranged from the other side toward the one side in the second direction Y. The first and second busbars 10, 20 are arranged at an interval in the second direction Y.

Note that, in the second direction Y, the side of the second busbar 20 with respect to the first busbar 10 is referred to as one side Y1 in the second direction and an opposite side thereof is referred to as an other side Y2 in the second direction in the following description.

The busbar 10, 20 includes a first connecting portion 11, 21 to be electrically connected to an unillustrated power supply, and a second connecting portion 12, 22 for supplying power from the power supply to the stator 91.

Further, the busbar 10, 20 includes an intermediate portion 13, 23 extending in the second direction Y between the first connecting portion 11, 21 and the second connecting portion 12, 22.

The tip of an end part 13a, 23a of the intermediate portion 13, 23 on the other side Y2 in the second direction is bent and extends in the third direction Z.

The first connecting portion 11, 21 is provided on an end part of the intermediate portion 13, 23 on the one side Y1 in the second direction. The connecting portion 11, 21 projects from an end surface on the inner side Z1 in the third direction of the above end part of the intermediate portion 13, 23, and the tip thereof rises and extends toward the one side X1 in the first direction. The first connecting portion 11, 21 is in the form of a flat plate extending in the first direction X and a direction orthogonal to both the first and third directions X, Y.

The second connecting portion 12, 22 extends in the third direction Z from the end part 13a, 23a of the intermediate portion 13, 23. The second connecting portion 12, 22 includes a flat plate part 12a, 22a in the form of a flat plate located on the side of the end part 13a, 23a in the third direction Z, and a bar-like terminal part 12b, 22b located on a tip side. The terminal part 12b, 22b projects from a part located furthest on the other side Y2 in the second direction, out of an end surface of the flat plate part 12a, 22a on the inner side Z1 in the third direction. Note that, in this embodiment, the terminal part 12b is a part to be connected to a power wire (not shown) of the coil corresponding to the U-phase, out of the coil 93. Further, the terminal part 22b is a part to be connected to a power wire (not shown) of the coil corresponding to the W-phase, out of the coil 93.

The flat plate part 12a, 22a is provided with a through hole 14, 24 penetrating in the first direction X.

<Configuration of Third Busbar 30>

Figure 5:
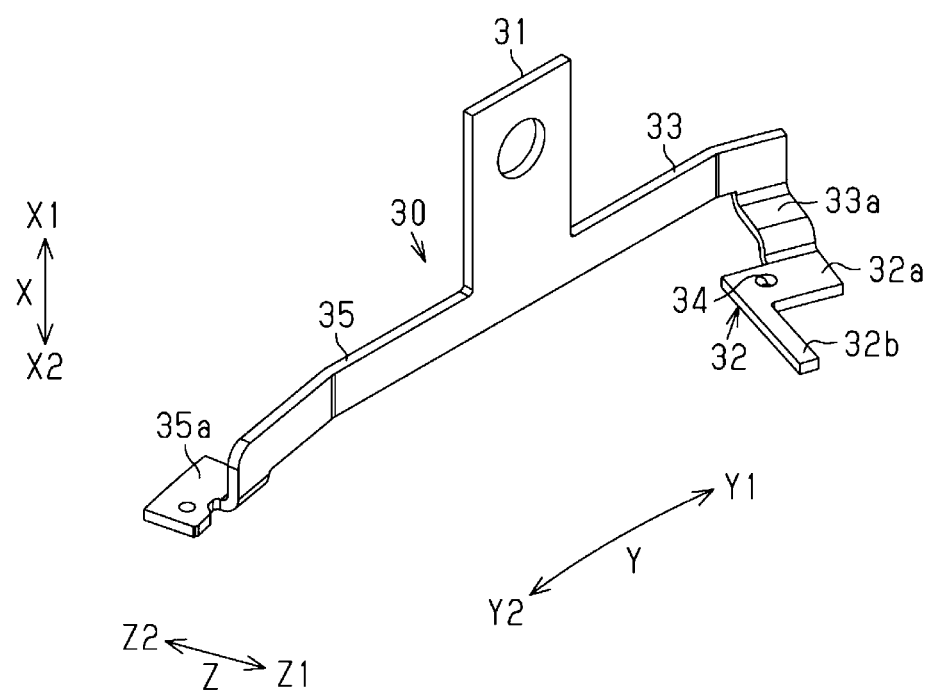
FIG. 5 is a perspective view showing a third busbar for the busbar module of FIG. 1.

As shown in FIG. 5, the third busbar 30 is formed of an electrically conductive metal plate material.

The third busbar 30 includes a first connecting portion 31 to be electrically connected to the unillustrated power supply and a second connecting portion 32 for supplying power from this power supply to the stator 91.

Further, the third busbar 30 includes an intermediate portion 33 extending in the second direction Y between the first and second connecting portions 31, 32, and an extending portion 35 extending from the first connecting portion 31 toward a side opposite to the intermediate portion 33 in the second direction Y.

The first connecting portion 31 is in the form of a flat plate extending in the first direction X and a direction orthogonal to both the first and third directions X, Z.

The intermediate portion 33 extends in the second direction Y from a part located furthest on the other side X2 in the first direction, out of an end surface of the first connecting portion 31 on the one side Y1 in the second direction. An end part 33a of the intermediate portion 33 on the one side Y1 in the second direction is bent toward the other side X2 in the first direction and the tip thereof extends toward the inner side Z1 in the third direction.

The second connecting portion 32 extends toward the inner side Z1 in the third direction from the end part 33a of the intermediate portion 33. The second connecting portion 32 includes a flat plate part 32a in the form of a flat plate located on the side of the end part 33a in the third direction Z and a bar-like terminal part 32b located on a tip side. The terminal part 32b projects from a part located furthest on the other side Y2 in the second direction, out of an end surface of the flat plate part 32a on the inner side Z1 in the third direction. Note that, in this embodiment, the terminal part 32b is a part to be connected to a power wire (not shown) of the coil corresponding to the V-phase, out of the coil 93.

The flat plate part 32a is provided with a through hole 34 penetrating in the first direction X.

The extending portion 35 extends in the second direction Y from a part located furthest on the other side X2 in the first direction, out of an end surface of the first connecting portion 31 on the other side Y2 in the second direction. An end part 35a of the extending portion 35 on the other side Y2 in the second direction is bent toward the other side X2 in the first direction, and the tip thereof extends toward the outer side Z2 in the third direction.

<Configuration of Fourth Busbar 40>

Figure 6:
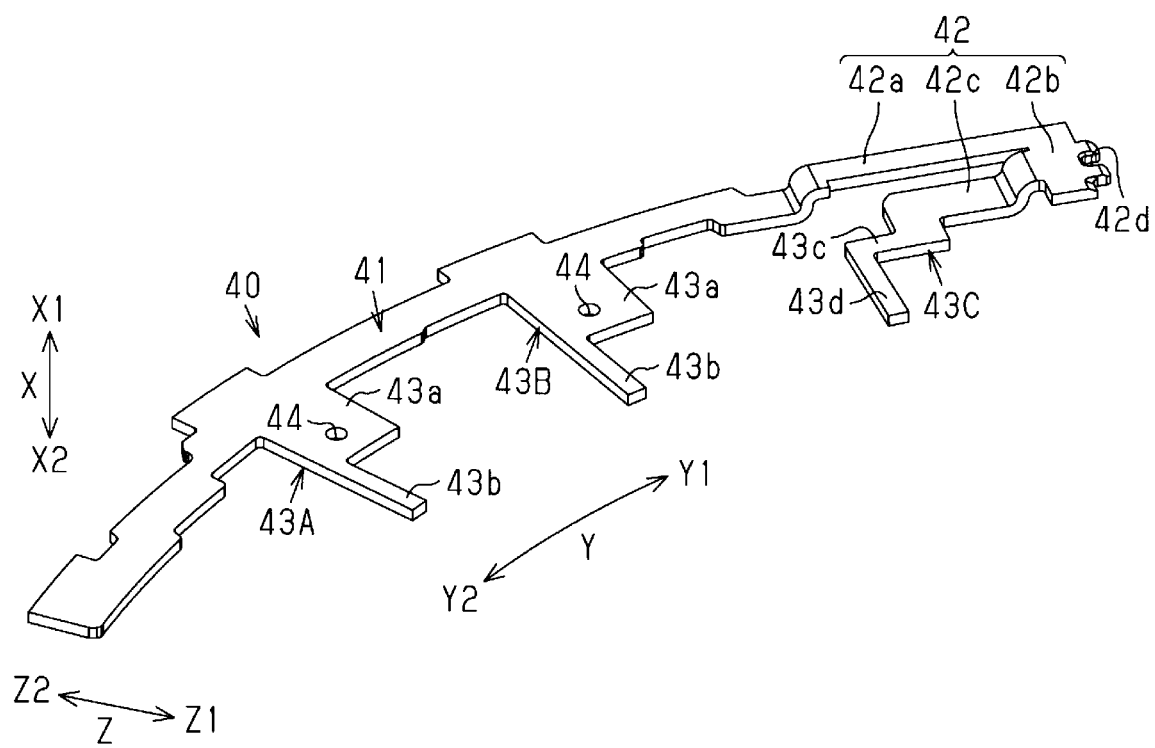
FIG. 6 is a perspective view showing a fourth busbar for the busbar module of FIG. 1.

As shown in FIG. 6, the fourth busbar 40 is formed of an electrically conductive metal plate material.

The fourth busbar 40 forms a neutral point of the coil 93 and includes a body portion 41 extending in the second direction Y and three third connecting portions 43A, 43B and 43C projecting from the body portion 41 and to be connected to a neutral wire (not shown) of the coil 93.

The tip of the body portion 41 on the one side Y1 in the second direction is folded to form a folded portion 42.

The folded portion 42 includes a base end part 42a extending in the second direction Y, a bent part 42b bent from the tip of the base end part 42a and a tip part 42c extending along the base end part 42a from the tip of the bent part 42b.

An end surface of the bent part 42b on the one side X1 in the first direction is a part to be brought into contact with a tip part of the temperature detector 81 of the temperature sensor 80. That is, the temperature detector 81 of the temperature sensor 80 detects a temperature of the fourth busbar 40.

A pair of protrusions projecting in the second direction Y and a recess 42d, into which a protrusion (not shown) formed on the temperature detector 81 is fit, are formed on an end surface of the bent part 42b on the one side Y1 in the second direction.

The third connecting portions 43A, 43B and 43C are successively arranged from the other side Y2 in the second direction toward the one side Y1 in the second direction. The third connecting portions 43A, 43B and 43C are arranged at equal intervals in the second direction Y.

The third connecting portion 43A, 43B projects from an end surface of the body portion 41 on the inner side Z1 in the third direction. The third connecting portion 43A, 43B includes a flat plate part 43a in the form of a flat plate located on the side of the body portion 41 in the third direction Z, and a bar-like terminal part 43b located on a tip side. The terminal part 43b projects from a part located furthest on the other side Y2 in the second direction, out of an end surface of the flat plate part 43a on the inner side Z1 in the third direction.

The third connecting portion 43C is provided on the tip of the tip part 42c of the folded portion 42. The third connecting portion 43C projects from an end surface of the tip part 42c on the inner size Z1 in the third direction. The third connecting portion 43C includes a base part 43c located on the side of the tip part 42c and extending in the second direction Y, and a bar-like terminal part 43d located on a tip side. The terminal part 43d projects from the projecting end of the base part 43c toward the inner side Z1 in the third direction. The third connecting portion 43C is L-shaped as a whole.

Note that, in this embodiment, the terminal parts 43b, 43d are parts to be connected to the neutral wire (not shown) of the coil 93.

The flat plate part 43a of the third connecting portion 43A, 43B is provided with a through hole 44 penetrating in the first direction X.

<Basic Configuration of Holding Member 50>

As shown in FIGS. 2 to 8, the holding member 50 is formed of an electrically insulating resin material and covers the busbars 10, 20, 30 and 40 and the temperature sensor 80.

The holding member 50 includes a first holding portion 51 configured to cover the both busbars 10, 20 and interposed between the first and second busbars 10, 20, and a second holding portion 56 configured to cover the first holding portion 51, the third busbar 30, the fourth busbar 40 and the temperature detector 81 of the temperature sensor 80.

Further, the holding member 50 includes a plurality of communication holes 70 communicating with the through holes 14, 24, 34 and 44 in the first direction X. The communication holes 70 include first holes 71 formed in the first holding portion 51 and second holes 72 formed in the second holding portion 56.

Next, each component of the holding member 50 is described in detail.

<Configuration of First Holding Portion 51>

Figure 7:
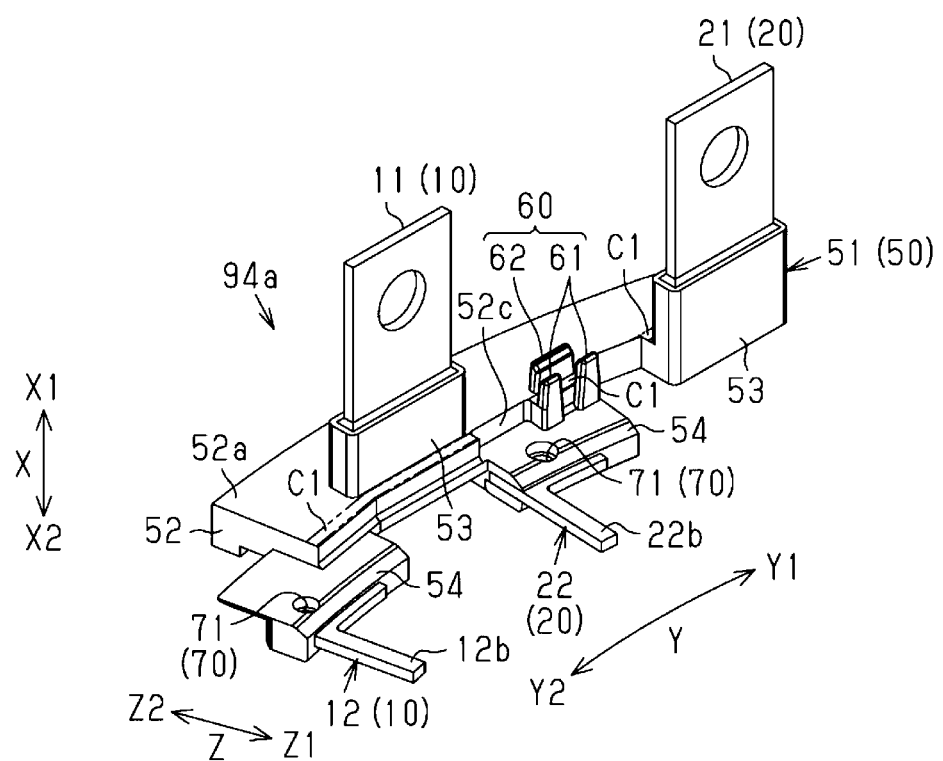
FIG. 7 is a perspective view showing a primary molded body for the busbar module of FIG. 1.
Figure 8:
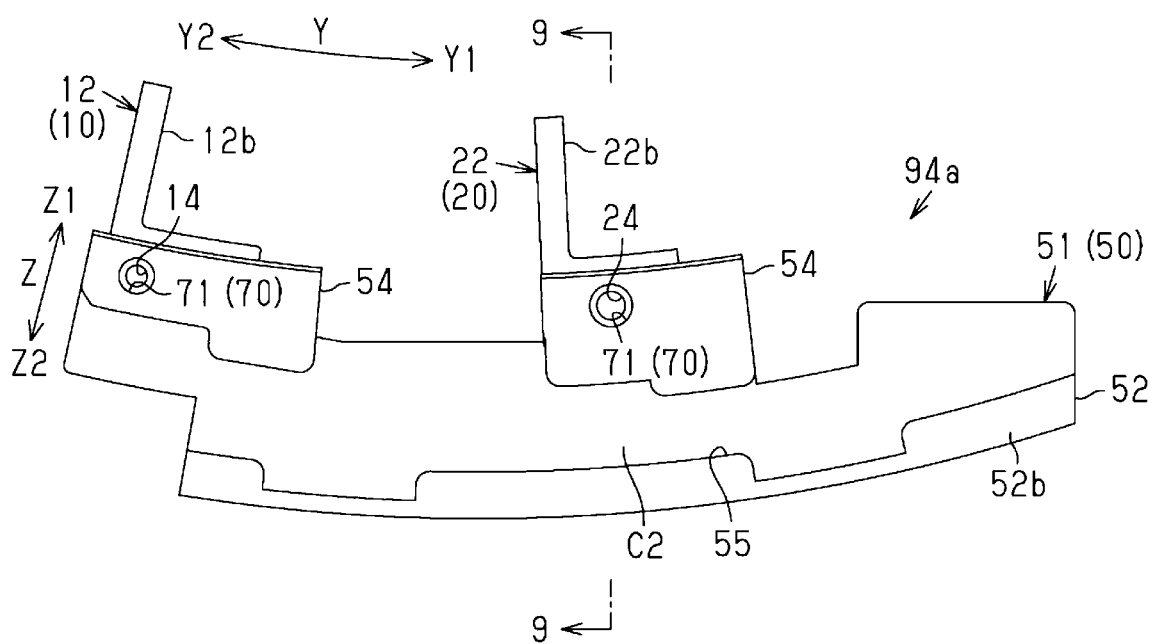
FIG. 8 is a bottom view showing the primary molded body for the busbar module of FIG. 1.

As shown in FIGS. 4, 7 and 8, the first holding portion 51 includes a base portion 52, a first enclosing portion 53 for covering the first connecting portions 11, 21, a second enclosing portion 54 for covering the second connecting portions 12, 22 and a projection 60.

The base portion 52 extends in the second direction Y and collectively covers the entire intermediate portions 13, 23 of the first and second busbars 10, 20.

Figure 10:
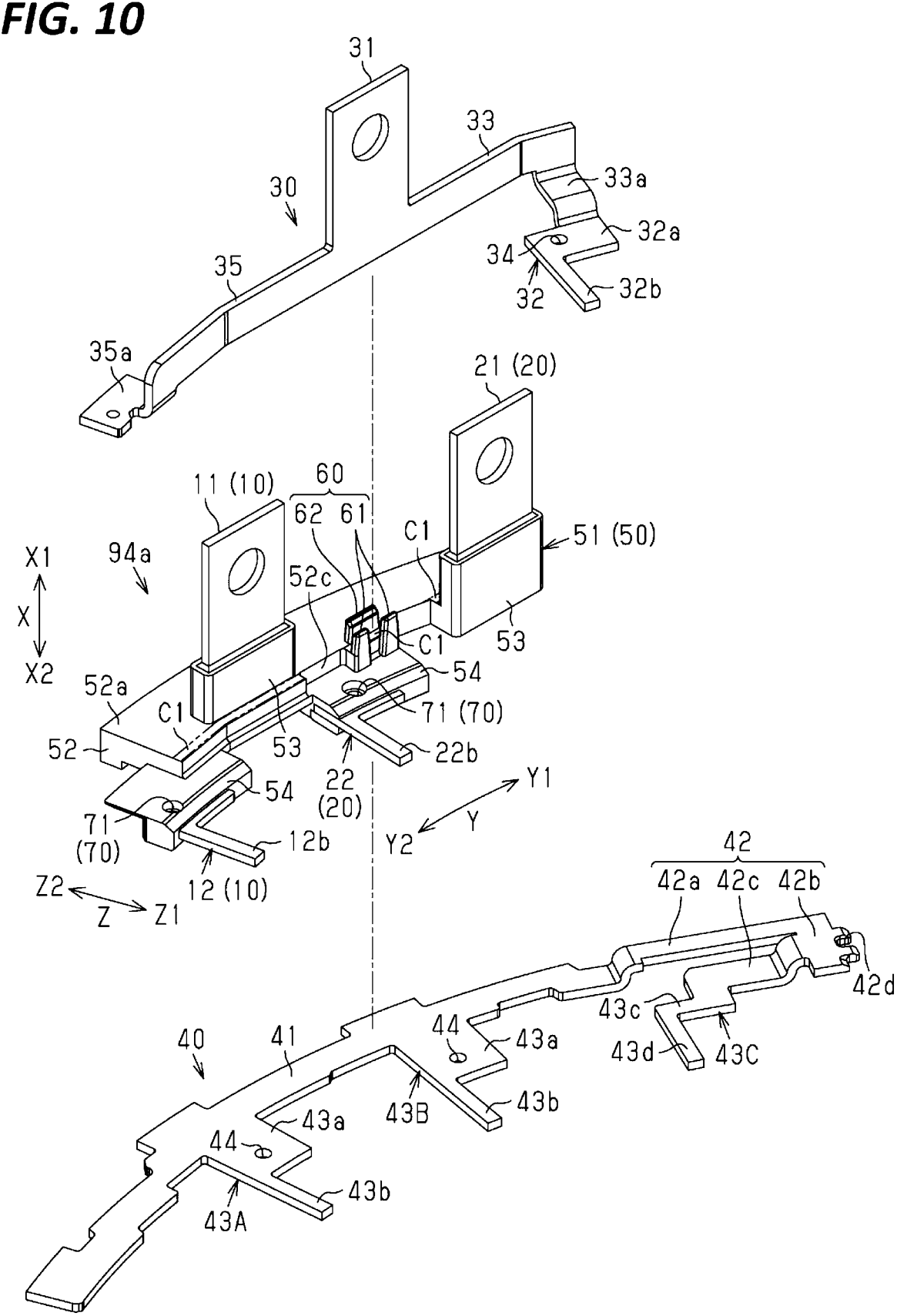
FIG. 10 is an exploded perspective view showing the primary molded body, the third busbar and the fourth busbar in a disassembled state for the busbar module of FIG. 1.

As shown by a two-dot chain line in FIGS. 7 and 10, the base portion 52 has a first contact surface C1, with which the end surface on the other side X2 in the first direction of each of the first connecting portion 31, the intermediate portion 33 and the extending portion 35 of the third busbar 30 is brought into contact. The first contact surface C1 is provided on an end surface 52a of the base portion 52 on the one side X1 in the first direction.

Figure 12:
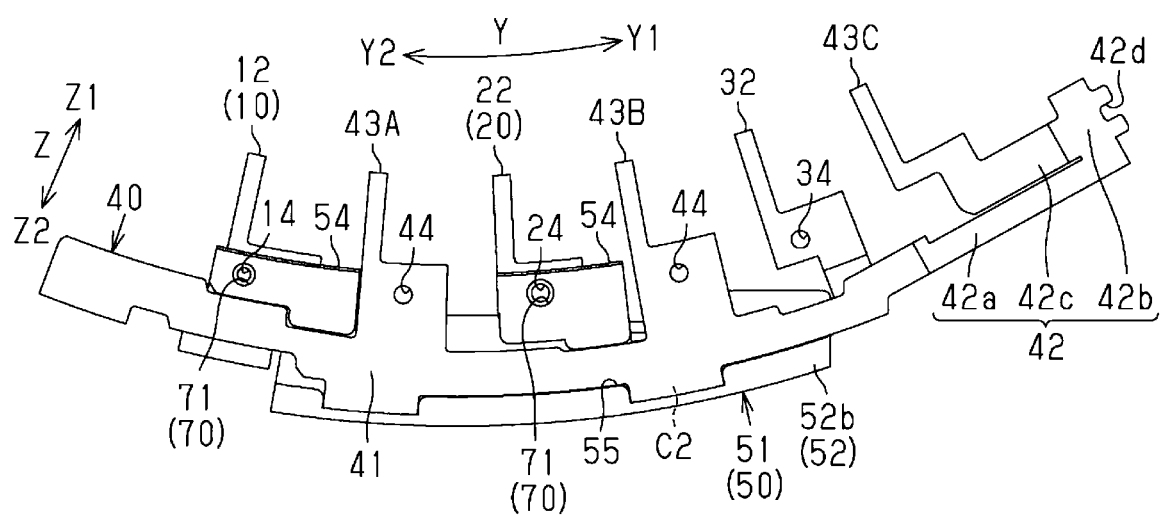
FIG. 12 is a bottom view showing the state where the third busbar and the fourth busbar are mounted on the primary molded body for the busbar module of FIG. 1.

As shown in FIGS. 8 and 12, a fitting recess 55 into which the fourth busbar 40 is fit is formed in an end surface 52b of the base portion 52 on the other side X2 in the first direction (front side in a direction orthogonal to the plane of FIG. 8). The bottom surface of the fitting recess 55 constitutes a second contact surface C2, with which the end surface of the fourth busbar 40 on the one side X1 in the first direction is brought into contact.

As shown in FIGS. 4 and 7, the first enclosing portion 54 extends from the base portion 52 toward the one side X1 in the first direction and covers base end sides of the first connecting portions 11, 21. Tip sides of the first connecting portions 11, 21 are exposed to outside (see FIG. 7).

As shown in FIGS. 4 and 8, the second enclosing portion 54 extends from the base portion 52 toward the inner side Z1 in the third direction and covers the flat plate parts 12a, 22a of the second connecting portions 12, 22. The terminal parts 12b, 22b of the second connecting portions 12, 22 are exposed to outside (see FIG. 8).

Each second enclosing portion 54 is formed with one first hole 71. The respective first holes 71 communicate with the through hole 14 of the first busbar 10 and the through hole 24 of the second busbar 20 in the first direction X.

As shown in FIG. 7, the projection 60 projects from the base portion 52 toward the one side X1 in the first direction on both sides of the first contact surface C1 in the third direction Z. The projection 60 includes a pair of first projections 61 located on the inner side Z1 in the third direction and a second projection 62 located on the outer side Z2 in the third direction.

The pair of first projections 61 project from an end surface 52c of the base portion 52 on the inner side Z1 in the third direction. The first projections 61 are arranged at an interval from each other in the second direction Y. Base end sides of the first projections 61 in the first direction X are connected to the outer surface of the second enclosing portion 54 covering the second connecting portion 22.

The second projection 62 projects from the end surface 52a of the base portion 52 in the first direction X and extends in the second direction Y.

<Configuration of Second Holding Portion 56>

As shown in FIGS. 2 and 3, the second holding portion 56 includes a base portion 57, a third enclosing portion 58 for partially covering the third busbar 30 and a supporting portion 59 for supporting the temperature detector 81 of the temperature sensor 80.

As shown in FIGS. 2 to 8, the base portion 57 extends in the second direction Y and covers the end parts 33a, 35a of the third busbar 30 and a part of the second connecting portion 32. Further, the base portion 57 covers an end surface of the first holding portion 51 on the other side X2 in the first direction and covers the body portion 41, the folded portion 42 and parts of the third connecting portions 43A, 43B and 43C of the fourth busbar 40. In particular, the base portion 57 covers the flat plate part 32a of the second connecting portion 32, the flat plate parts 43a of the third connecting portions 43A, 43B and the base part 43c of the third connecting portion 43C. The terminal parts 32b, 43b and 43d of the busbars 30, 40 are exposed to outside (see FIGS. 2 and 3).

As shown in FIG. 3, the base portion 57 is formed with four second holes 72.

As shown in FIGS. 2 to 6, the respective second holes 72 communicate with the through hole 24 of the second busbar 20, the through hole 34 of the third busbar 30 and the two through holes 44 of the fourth busbar 40 in the first direction X. The second hole 72 communicating with the through hole 24 also communicates with the first hole 71 in the first direction X.

As shown in FIGS. 2 and 5, the third enclosing portion 58 extends from the base portion 57 toward the one side X1 in the first direction. The third enclosing portion 58 covers a base end side of the first connecting portion 31 of the third busbar 30 and parts extending in both the first and second directions X, Y, out of the intermediate portion 33 and the extending portion 35 extending from the first connecting portion 31. A tip side of the first connecting portion 31 is exposed to outside (see FIG. 2).

As shown in FIGS. 2 and 6, the supporting portion 59 is provided on an end part of the base portion 57 on the one side Y1 in the second direction. The supporting portion 59 collectively covers the bent part 42b and the tip part of the temperature detector 81 of the temperature sensor 80 with the tip part of the temperature detector 81 held in contact with the bent part 42b of the folded portion 42 (see FIG. 2).

The second holding portion 56 is formed with a plurality of holes 73. The plurality of holes 73 are provided at positions not overlapping the second holes 72 in the first direction X.

<Manufacturing Method of Busbar Module 94>

Figure 13:
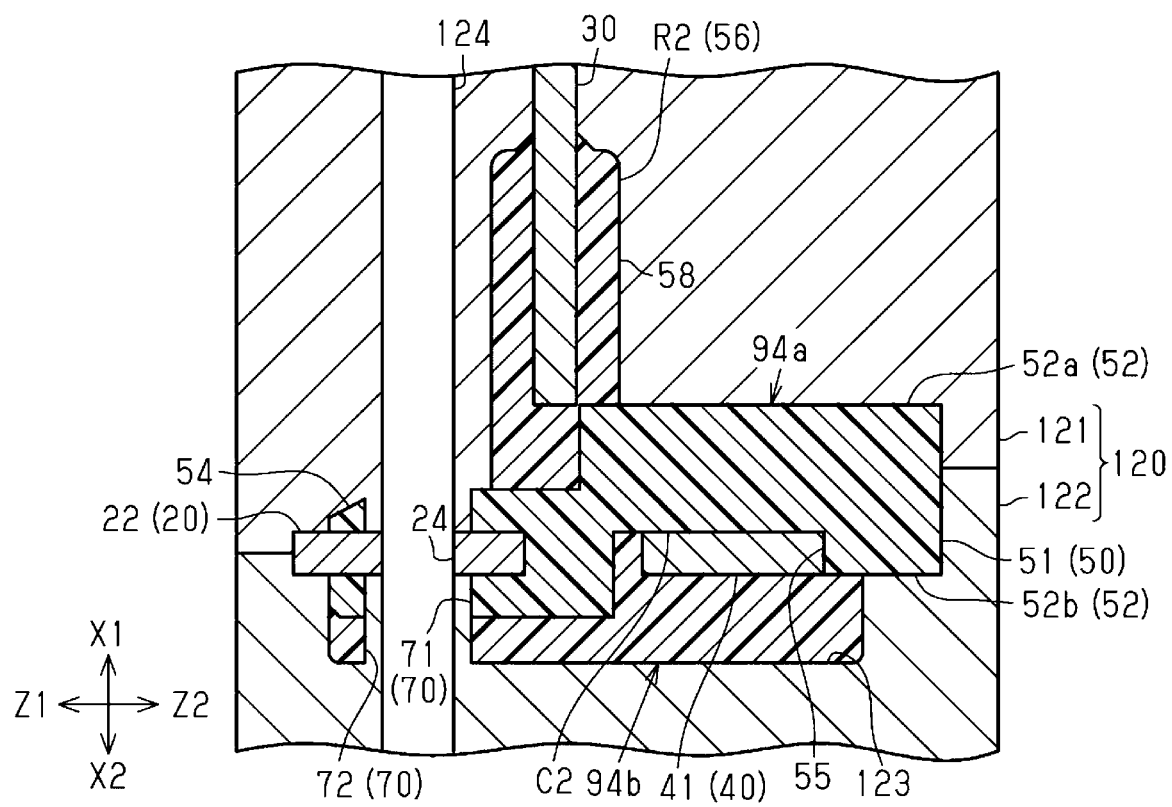
FIG. 13 is a section showing a state where a molten resin is filled in a cavity of a second mold for the busbar module of FIG. 1.
Figure 14:
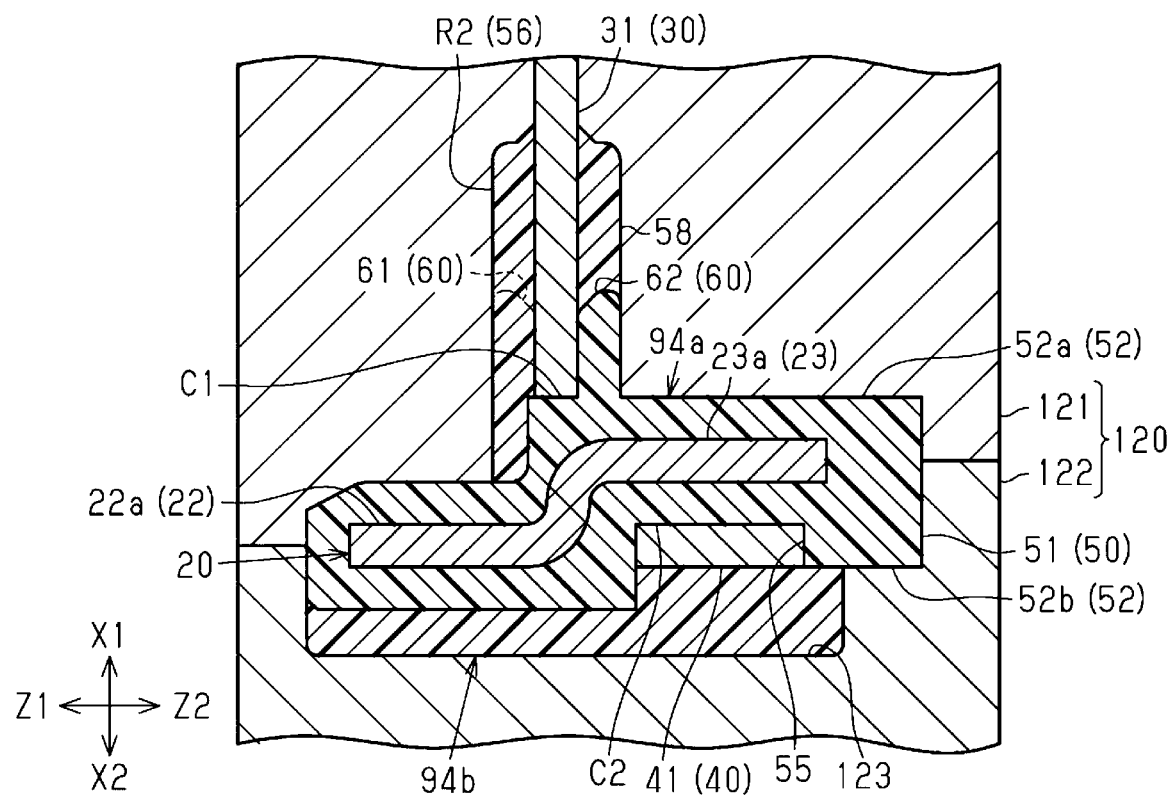
FIG. 14 is a section showing a state where the molten resin is filled in the cavity of the second mold for the busbar module of FIG. 1.

Next, a manufacturing method of the busbar module 94 is described with reference to FIGS. 9 to 14. Note that FIG. 9 is a view, corresponding to a section along 9-9 of FIG. 8, and FIGS. 13 and 14 are views, corresponding to sections along 13-13 and 14-14 of FIG. 11.

Figure 9:
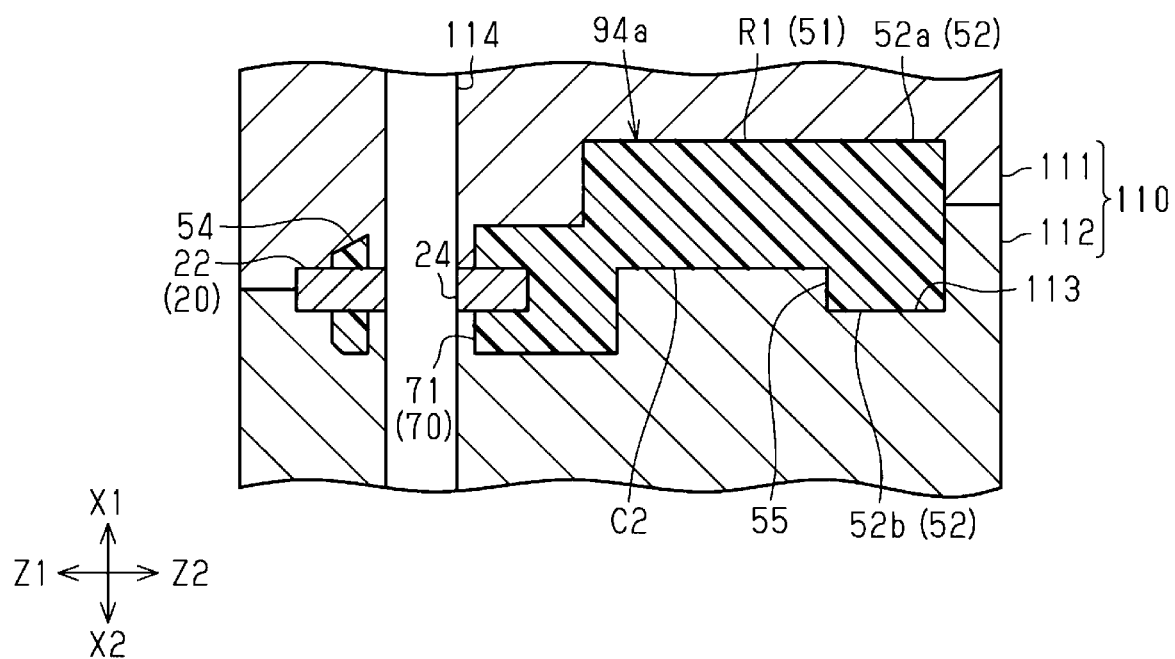
FIG. 9 is a section showing a state where a molten resin is filled in a cavity of a first mold for the busbar module of FIG. 1.

First, as shown in FIG. 9, a positioning pin 114 is inserted into the through hole 24 of the second busbar 20. Although not shown, a positioning pin 114 is inserted into the through hole 14 of the first busbar 10. In this state, an upper mold 111 and a lower mold 112 of a first mold 110 are clamped. In this way, the first and second busbars 10, 20 inserted in the first mold 110 are positioned with respect to a cavity 113.

Subsequently, a molten resin R1 is filled into the cavity 113 of the first mold 110. In this way, a primary molded body 94a composed of the first busbar 10, the second busbar 20 and the first holding portion 51 is formed. At this time, the first holding portion 51 is formed with the first holes 71 respectively communicating with the through holes 14, 24.

Subsequently, as shown in FIG. 10, the third and fourth busbars 30, 40 are mounted on the primary molded body 94a.

Figure 11:
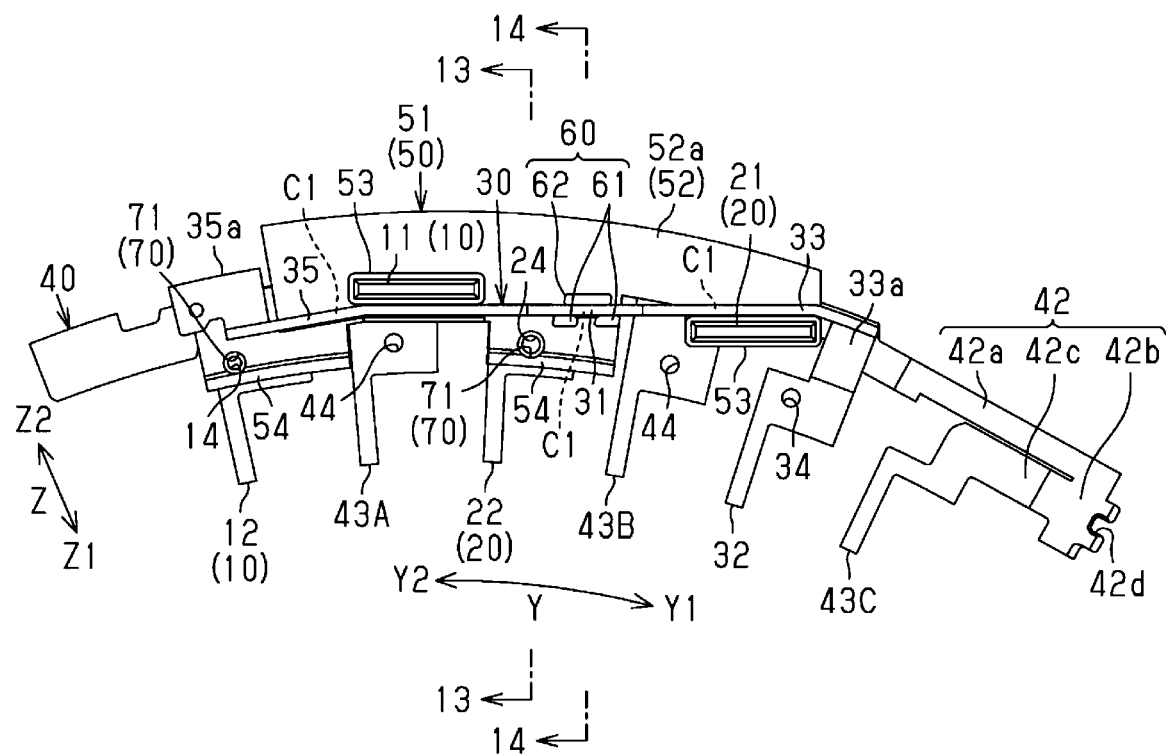
FIG. 11 is a plan view showing a state where the third busbar and the fourth busbar are mounted on the primary molded body for the busbar module of FIG. 1.

As shown in FIGS. 10 and 11, the first connecting portion 31 of the third busbar 30 is inserted between the pair of first projections 61 and the second projection 62 projecting from the base portion 52 to mount the third busbar 30 on the end surface 52a of the base portion 52. Then, the third busbar 30 is further inserted until the end surface of each of the first connecting portion 31, the intermediate portion 33 and the extending portion 35 of the third busbar 30 on the other side X2 in the first direction comes into contact with the first contact surface C1 of the base portion 52. In this way, the third busbar 30 is mounted on the primary molded body 94a.

At this time, the first connecting portion 31 of the third busbar 30 is in contact with the pair of first projections 61 and the second projection 62. Further, the first connecting portion 31 of the third busbar 30 is located between the first connecting portion 11 of the first busbar 10 and the first connecting portion 21 of the second busbar 20 in both the second and third directions Y, Z. The intermediate portion 33 of the third busbar 30 is in contact with the first enclosing portion 53 covering the first connecting portion 21 of the second busbar 20, out of the two first enclosing portions 53, from the outer side Z2 in the third direction. The extending portion 35 of the third busbar 30 is in contact with the first enclosing portion enclosing portion 53 covering the first connecting portion 11 of the first busbar 10, out of the two first enclosing portions 53, from the inner side Z1 in the third direction.

As shown in FIGS. 10 and 12, the fourth busbar 40 is mounted into the fitting recess 55 formed in the end surface 52a of the base portion 52 on the other side X2 in the first direction. In this way, the fourth busbar 40 is positioned at a proper mount position with respect to the primary molded body 94a. At this time, the end surface of the fourth busbar 40 on the one side X1 in the first direction is in contact with the second contact surface C2 (see FIG. 8) of the base portion 52.

Note that, at this time, the third busbar 30, the first and second busbars 10, 20 and the fourth busbar 40 are arranged at intervals from each other in the first direction X (see FIGS. 1, 3 and 14).

Subsequently, as shown in FIG. 13, a positioning pin 124 is inserted into the through hole 24 of the second busbar 20. Further, although not shown, positioning pins 124 are inserted into the through holes 34, 44 of the third and fourth busbars 30, 40. In this state, as shown in FIGS. 13 and 14, an upper mold 121 and a lower mold 122 of a second mold 120 are clamped. At this time, the primary molded body 94a, the third busbar 30, the fourth busbar 40 and the temperature detector 81 are fixed by a plurality of jigs (not shown) for sandwiching the respective busbars 10, 20, 30 and 40 and the temperature detector 81 from both sides in the first direction X. In this way, the primary molded body 94a, the third busbar 30, the fourth busbar 40 and the temperature detector 81 inserted in the second mold 120 are positioned with respect to the cavity 123.

Subsequently, a molten resin R2 is filled into the cavity 123 of the second mold 120. In this way, a secondary molded body 94b composed of the primary molded body 94a, the third busbar 30, the fourth busbar 40, the second holding portion 56 and the temperature sensor 80 is formed. At this time, as shown in FIG. 13, the second holding portion 56 is formed with the second holes 72 respectively communicating with the through hole 24 and the first hole 71 communicating with the through hole 24, the through hole 34 and the two through holes 44.

Further, as shown in FIG. 2, the second holding portion 56 is formed with the plurality of holes 73 by the above plurality of jigs (not shown).

Note that, at this time, the second connecting portion 12, the third connecting portion 43A, the second connecting portion 22, the third connecting portion 43B, the second connecting portion 32, and the third connecting portion 43C are successively arranged from the other side Y2 in the second direction to the one side Y1 in the second direction and arranged at equal intervals from each other in the second direction Y.

Next, functions of this embodiment are described.

First, the molten resin R1 is filled into the cavity 113 of the first mold 110 with the first and second busbars 10, 20 inserted in the first mold 110. In this way, the primary molded body 94a composed of the first busbar 10, the second busbar 20 and the first holding portion 51 is formed. At this time, an interval between the busbars 10 and 20 can be increased as compared to the case where a molten resin is filled into a cavity of a mold with the first, second, third and fourth busbars 10, 20, 30 and 40 inserted in the mold. In this way, a difference in the fluid pressure of the molten resin R1 is suppressed.

Subsequently, the molten resin R2 is filled into the cavity 123 of the second mold 120 with the primary molded body 94a, the third busbar 30 and the fourth busbar 40 inserted in the second mold 120. In this way, the secondary molded body 94b composed of the primary molded body 94a, the third busbar 30, the fourth busbar 40 and the second holding portion 56 is formed. At this time, since the third and fourth busbars 30, 40 are in contact with the first holding portion 51, there is no gap between the third busbar 30 and the first holding portion 51 and between the fourth busbar 40 and the first holding portion 51. Thus, the molten resin R2 does not flow between the third busbar 30 and the first holding portion 51 and between the fourth busbar 40 and the first holding portion 51.

Next, effects of this embodiment are described.

(1) The holding member 50 includes the first holding portion 51 configured to cover the first and second busbars 10, 20 and interposed between the first and second busbars 10, 20, and the second holding portion 56 configured to cover the first holding portion 51, the third busbar 30 and the fourth busbar 40. The third busbar 30 is in contact with the first holding portion 51.

According to this configuration, the aforementioned functions are achieved. Therefore, positional deviations of the busbars 10, 20 and 30 can be suppressed.

(2) The intermediate portion 33 of the third busbar 30 is in the form of a plate extending in the first and second directions X, Y. The first holding portion 51 includes the base portion 52 having the first contact surface C1, with which the end surface on the other side X2 in the first direction of each of the first connecting portion 31, the intermediate portion 33 and the extending portion 35 of the third busbar 30 is brought into contact. Further, the first holding portion 51 includes the projection 60 projecting from the base portion 52 on both sides of the first contact surface C1 in the third direction Z and configured to sandwich the first connecting portion 31 of the third busbar 30.

According to this configuration, in forming the secondary molded body 94b, a relative movement of the third busbar 30 with respect to the first holding portion 51, i.e. the primary molded body 94a, in the third direction Z due to the fluid pressure of the molten resin R2 is restricted by the projection 60. Therefore, a positional deviation of the third busbar 30 can be further suppressed.

(3) The first, second, third and fourth busbars 10, 20, 30 and 40 respectively include the through holes 14, 24, 34 and 44. The holding member 50 includes the communication holes 70 communicating with the through holes 14, 24, 34 and 44 in the first direction X.

According to this configuration, when the first mold 110 is clamped, the positioning pins 114 are inserted into the respective through holes 14, 24 of the first and second busbars 10, 20. In this state, the molten resin R1 is filled into the cavity 113 of the first mold 110. In this way, positional deviations of the first and second busbars 10, 20 can be further suppressed. At this time, the first holding portion 51 is formed with the communication holes 70 communicating with the respective through holes 14, 24.

Further, when the fourth mold 120 is clamped, the positioning pins 124 are inserted into the respective through holes 34, 44 of the third and fourth busbars 30, 40. In this state, the molten resin R2 is filled into the cavity 123 of the fourth mold 120. In this way, positional deviations of the third and fourth busbars 30, 40 can be further suppressed. At this time, the second holding portion 56 is formed with the communication holes 70 communicating with the respective through holes 34, 44.

Accordingly, the positional deviations of the first, second, third and fourth busbars 10, 20, 30 and 40 can be further suppressed.

(4) The communication holes 70 include the plurality of first holes 71 formed in the first holding portion 51 and the plurality of second holes 72 formed in the second holding portion 56. One of the plurality of second holes 72 communicates in the first direction X with the first hole 71 communicating with the through hole 24.

According to this configuration, when the second mold 120 is clamped, the positioning pin 124 is inserted into the through hole 24 provided in the second busbar 20 constituting the primary molded body 94a and the first hole 71 communicating with the through hole 24. Therefore, the through hole 24 and the first hole 71 formed in the first holding portion 51, which holes were used in forming the primary molded body 94a, can be used in forming the secondary molded body 94b.

(5) The first holding portion 51 is provided with the base portion 52. The base portion 52 has the first contact surface C1, with which the end surface on the other side X2 in the first direction of each of the first connecting portion 31, the intermediate portion 33 and the extending portion 35 of the third busbar 30 is brought into contact. Further, the base portion 52 has the second contact surface C2, which is located on the side opposite to the first contact surface C1 in the first direction X and with which the fourth busbar 40 is brought into contact. The second holding portion 56 covers the fourth busbar 40.

According to this configuration, the secondary molded body 94b is formed by filling the molten resin R2 into the cavity 123 of the second mold 120 with the primary molded body 94a, the third busbar 30 and the fourth busbar 40 inserted in the second mold 120. At this time, since the fourth busbar 140 is in contact with the first holding portion 51, there is no gap between the fourth busbar 40 and the first holding portion 51. Thus, the molten resin R2 does not flow between the fourth busbar 40 and the first holding portion 51. In this way, the positional deviation of the fourth busbar can be suppressed as compared to the case where the molten resin R2 is filled with a gap formed between the fourth busbar 40 and the first holding portion 51.

(6) The first connecting portion 31 of the third busbar 30 is located between the first connecting portion 11 of the first busbar 10 and the first connecting portion 21 of the second busbar 20 in both the second and third directions Y, Z. The first enclosing portions 53 of the first holding portion 51 cover the first connecting portions 11, 12 of both the first and second busbars 10, 20. The intermediate portion 33 of the third busbar 30 extends from the first connecting portion 31 toward the one side Y1 in the second direction. The third busbar 30 includes the extending portion 35 extending from the base end of the first connecting portion 31 toward the side opposite to the intermediate portion 33 of the third busbar 30 in the second direction Y. The intermediate portion 33 of the third busbar 30 is, in the third direction Z, in contact with the first enclosing portion 53 of the first holding portion 51 covering the first connecting portion 21 of the second busbar 20. The extending portion 35 is, in the third direction Z, in contact with the first enclosing portion 53 of the holding portion 51 covering the first connecting portion 11 of the first busbar 10.

According to this configuration, the first enclosing portions 53 of the first holding portion 51 are interposed between the first connecting portions 11, 12 of both the first and second busbars 10, 20 and the intermediate portion 33 and the extending portion 35 of the third busbar 30. Therefore, the first and second busbars 10, 20 are electrically insulated from the third busbar 30.

Further, in forming the secondary molded body 94b, a relative movement of the third busbar 30 with respect to the primary molded body 94a in the third direction Z due to the fluid pressure of the molten resin R2 is restricted by the first enclosing portions 53 covering the first connecting portions 11, 21. Therefore, the positional deviation of the third busbar 30 can be further suppressed.

<Modifications>

This embodiment can be modified and carried out as follows. This embodiment and the following modifications can be carried out in combination without technically contradicting each other.

The temperature sensor 80 is not limited to the one provided on the end part of the busbar module 94 on the one side Y1 in the second direction as illustrated in this embodiment, and the arrangement thereof may be appropriately changed according to installation requirements of the busbar module 94 on the stator 91. For example, the temperature sensor 80 may be provided on the end part of the busbar module 94 on the other side Y2 in the second direction or may be provided in a center of the busbar module 94 in the second direction Y.

The temperature sensor 80 may be omitted. In this case, the supporting portion 59 can be omitted from the second holding portion 56.

The shapes of the respective busbars 10, 20, 30 and 40 are not limited to those illustrated in this embodiment and may be appropriately changed according to the installation requirements on the stator 91. For example, the extending portion 35 may be omitted from the third busbar 30 or the folded portion 42 may be omitted from the fourth busbar 40. Further, according to these changes, the arrangement of the second connecting portions 12, 22 and 32 and the third connecting portions 43A, 43B and 43C of the busbar module 94 may be appropriately changed.

The number of the fourth busbar 40 is not limited to one as illustrated in this embodiment and may be, for example, two or more. Further, the fourth busbar 40 may be omitted. In this case, the fitting recess 55 can be omitted from the end surface 52b of the first holding portion 51.

The second holding portion 56 may include a second hole 72 communicating in the first direction X with the through hole 14 and the first hole 71 communicating with the through hole 14. In this case, the second hole 72 communicating in the first direction X with the through hole 24 and the first hole 71 communicating with the through hole 24 can be omitted from the second holding portion 56.

The second holding portion 56 is not limited to the one including the second hole 72 communicating with the first hole 71 in the first direction X as illustrated in this embodiment. That is, the second hole 72 communicating with the first hole 71 in the first direction X may be omitted from the second holding portion 56.

The number and arrangement of the through holes 14, 24, 34 and 44 are not limited to those illustrated in this embodiment and may be appropriately changed according to the shapes of the respective busbars 10, 20, 30 and 40.

The communication holes 70 are not limited to those including the second holes 72. That is, the second holes 72 may be omitted from the second holding portion 56. In this case, the through holes 34, 44 can be omitted from the third and fourth busbars 30, 40. Further, in this case, the third and fourth busbars 30, 40 may be, for example, sandwiched from both sides in the first direction X by a jig in forming the secondary molded body 94b. At this time, the second holding portion 56 is formed with the holes 73 by the jig described above. Note that, even in such a case, the holes 73 are preferably provided at the same positions as the original second holes 72. According to this configuration, deviations of the second connecting portion 32 of the third busbar 30 and the third connecting portions 43A, 43B and 43C of the fourth busbar 40 from proper positions can be suppressed.

The first holes 71 may be omitted. In this case, the through holes 14, 24 can be omitted form the first and second busbars 10, 20. Further, in this case, the first and second busbars 10, 20 may be, for example, sandwiched from both sides in the first direction X by a jig in forming the primary molded body 94a. At this time, the first holding portion 51 is formed with the holes 73 by the jig described above. Note that, even in such a case, the holes 73 are preferably provided at the same positions as the original first holes 71. According to this configuration, deviations of the second connecting portion 12, 22 of the first and second busbars 10, 20 from proper positions can be suppressed.

The holes 73 may be omitted from the holding member 50. In particular, the holes 73 may be filled up by another resin member after the holding member 50 is molded.

The shape of the projection 60 is not limited to the one illustrated in this embodiment. For example, the projection 60 may include one first projection 61 or a plurality of the second projections 62 may be arranged at intervals in the second direction Y.

The number of the projection 60 is not limited to one as illustrated in this embodiment. For example, a plurality of the projections 60 may be arranged at intervals along an extending direction of the first contact surface C1. In this case, the projections 60 are not limited to those for sandwiching only the first connecting portion 31 of the third busbar 30 from both sides in the third direction Z, and may sandwich at least one of the first connecting portion 31 and the intermediate portion 33 of the third busbar 30 from both sides in the third direction Z.

The first contact surface C1 is not limited to the one, with which the end surface on the other side X2 in the first direction of each of the first connecting portion 31, the intermediate portion 33 and the extending portion 35 of the third busbar 30 is brought into contact, as illustrated in this embodiment. For example, at least one of the first connecting portion 31 and the intermediate portion 33 may be brought into contact with the first contact surface C1.

The arrangement of the plurality of busbars is not limited to the one illustrated in this embodiment and can be appropriately changed according to the installation requirements on the stator 91. Even in this case, the plurality of busbars may be arranged at intervals from each other in the first direction X and arranged side by side in the second direction Y.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A busbar module for rotating electric machine comprising:
   a stator provided in the rotating electric machine and including a coil electrically connected to the rotating electric machine;
   a plurality of busbars arranged at intervals from each other in a first direction and arranged side by side in a second direction when an axial direction, a circumferential direction and a radial direction of the rotating electric machine are respectively the first direction, the second direction and a third direction, and
   a holding member formed of electrically insulating resin to cover the plurality of busbars,
   wherein:
   the plurality of busbars include a first busbar, a second busbar and a third busbar each having:
     a first connecting portion extending in the first direction and to be electrically connected to a power supply;
     a second connecting portion extending in the third direction and configured to supply power from the power supply to the stator; and
     an intermediate portion extending in the second direction between the first and second connecting portions,
   the holding member includes:
     a first holding portion including a first projection and a second projection projecting upwardly from an upper surface and a side surface thereof, respectively and interposed between the first and second busbars, the first holding portion being configured to cover the first and second busbars; and a second holding portion configured to cover the first holding portion and the third busbar, and the third busbar is in contact with the first holding portion such that the first connecting portion of the third busbar is inserted between the first projection and the second projection of the first holding portion.

2. The busbar module for rotating electric machine of claim 1, wherein:

the intermediate portion of the third busbar has a plate shape extending in the first and second directions, and the first holding portion includes a base portion having a contact surface, one end surface in the first direction of at least one of the first connecting portion and the intermediate portion of the third busbar being brought into contact with the contact surface, wherein the first projection and the second projection project from the base portion on both sides in the third direction of the contact surface and sandwich at least one of the first connecting portion and the intermediate portion of the third busbar from above.

3. The busbar module for rotating electric machine of claim 1, wherein:

at least one of the first, second and third busbars includes a through hole penetrating in the first direction, and the holding member includes a communication hole communicating with the through hole in the first direction.

4. The busbar module for rotating electric machine of claim 3, wherein each of the first, second and third busbars includes the through hole.

5. The busbar module for rotating electric machine of claim 3, wherein:

the communication hole includes a first hole formed in the first holding portion and a second hole formed in the second holding portion, and the second hole communicates with the first hole in the first direction.

6. The busbar module for rotating electric machine of claim 1, wherein:

the plurality of busbars include a fourth busbar electrically connected to a neutral wire of the coil, the first holding portion includes:

a base portion having a first contact surface, one end surface in the first direction of at least one of the first connecting portion and the intermediate portion of the third busbar being brought into contact with the first contact surface, and a second contact surface located on a side opposite to the first contact surface in the first direction, the fourth busbar being brought into contact with the second contact surface, and the second holding portion covers the fourth busbar.

7. The busbar module for rotating electric machine of claim 1, wherein:

the first connecting portion of the third busbar is located between the first connecting portion of the first busbar and the first connecting portion of the second busbar in both the second and third directions, the first holding portion covers the first connecting portions of both the first and second busbars, the intermediate portion of the third busbar extends from the first connecting portion toward one side in the second direction, the third busbar includes an extending portion extending from a base end of the first connecting portion to a side opposite to the intermediate portion of the third busbar in the second direction, the intermediate portion of the third busbar is, in the third direction, in contact with a part of the first holding portion covering either one of the first and second busbars, and the extending portion is, in the third direction, in contact with a part of the first holding portion covering the other of the first and second busbars.

8. The busbar module for rotating electric machine of claim 1, wherein the second projection includes a pair of projections provided at an inner side than the first projection in the radial direction of the rotating electric machine.

* * * * *